US008384727B2

(12) United States Patent
Hwang et al.

(10) Patent No.: US 8,384,727 B2
(45) Date of Patent: Feb. 26, 2013

(54) VIDEO DISPLAY DEVICE CAPABLE OF COMPENSATING FOR DISPLAY DEFECTS

(75) Inventors: Jong Hee Hwang, Gyeonggi-do (KR); Hye Jin Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1099 days.

(21) Appl. No.: 12/318,266

(22) Filed: Dec. 23, 2008

(65) Prior Publication Data

US 2010/0053185 A1 Mar. 4, 2010

(30) Foreign Application Priority Data

Aug. 26, 2008 (KR) ........................ 10-2008-0083300

(51) Int. Cl.
*G09G 5/36* (2006.01)
*G06F 3/038* (2006.01)

(52) U.S. Cl. ........................................ 345/556; 345/214

(58) Field of Classification Search .................. 345/556, 345/214

See application file for complete search history.

(56) References Cited

U.S. PATENT DOCUMENTS

2005/0219176 A1 10/2005 Song
2006/0188194 A1* 8/2006 Ghandi et al. .................. 385/16
2008/0001869 A1* 1/2008 Chung et al. .................... 345/87

FOREIGN PATENT DOCUMENTS

DE 102006060399 A1 1/2008

* cited by examiner

*Primary Examiner* — James A Thompson
*Assistant Examiner* — Wynton S Jones
(74) *Attorney, Agent, or Firm* — Morgan, Lewis & Bockius LLP

(57) ABSTRACT

A video display device including an integrated atypical/typical defect compensation circuit is disclosed. The video display device includes a display panel, a memory storing atypical/typical defect information used to compensate atypical/typical defect regions of the display panel, and an integrated atypical/typical compensation circuit including a first compensator for compensating input data to be displayed on the atypical/typical defect regions, using the atypical/typical defect information from the memory, and a second compensator for finely compensating the data compensated by the first compensator, using first and second dithering patterns. The compensation circuit supplies data to be displayed on normal regions, without compensation. The video display device also includes a timing controller including a dithering unit for finely compensating data output from the integrated atypical/typical compensation circuit, using a third dithering pattern different from the first and second dithering patterns, and a panel driver for driving the display panel under a control of the timing controller.

9 Claims, 14 Drawing Sheets

Coordinates of Compensation Regions
for one Atypical Defect
x coordinates : 24
y coordinates : 50

Coordinates of Compensation Regions
for a First Typical Defect
x coordinates : 13
y coordinates : 30

Coordinates of Compensation Regions
for a Second Typical Defect
x coordinates : 11
y coordinates : 20

1/4

2/4

3/4

4/4

VIDEO DISPLAY DEVICE CAPABLE OF COMPENSATING FOR DISPLAY DEFECTS

This application claims the benefit of the Korean Patent Application No. 10-2008-0083300, filed on Aug. 26, 2008, which is hereby incorporated by reference as if fully set forth herein.

BACKGROUND OF THE INVENTION

1. Field of the Invention

The present invention relates to a video display device, and more particularly, to a video display device including an integrated atypical/typical defect compensation circuit capable of compensating for atypical display defects as well as typical display defects.

2. Discussion of the Related Art

Recently, for video display devices, flat display devices, such as a liquid crystal display (LCD), a plasma display panel (PDP), and an organic light emitting diode (OLED) display device, have mainly been used.

Such a video display device is subjected to an inspection process at a manufacture stage in which the manufacture of a display panel has been completed, to inspect display defects possibly existing on the display panel. When the display panel is detected as having display defects, a repair process is carried out to repair defected portions of the display panel. However, there may be display defects that cannot be repaired by the repair process.

Display defects are mainly caused by a deviation in exposure light amount resulting from the overlapped light exposure in a multi-exposure operation of exposure equipment used in a thin film pattern formation process and the aberrations of multi-lenses used in the exposure equipment. The deviation in exposure light amount causes a variation in the width of thin film patterns, thereby resulting in a deviation in parasitic capacity among thin film transistors, a deviation in height among column spacers to maintain a desired cell gap, a deviation in parasitic capacity among signal lines, etc. Such deviations cause a brightness deviation, so that display defects in the form of vertical lines or horizontal lines may be displayed. Meanwhile, in the case of a liquid crystal display device, which needs a backlight unit, there is a tendency to reduce the spacing of a liquid crystal panel from the backlight unit, in order to achieve slimness. In this case, however, the diffusion path of light emitted from the backlight unit is insufficient, so that typical display defects in the form of horizontal lines corresponding to respective positions of a plurality of lamps may be displayed. However, it is difficult or impossible to eliminate such typical display defects, even through an improvement in process techniques. To this end, a method for compensating for the brightness of a typical display defect region through a data compensation method has recently been proposed.

Meanwhile, display defects may be displayed in the form of not only typical display defects as mentioned above, but also irregular display defects, namely, atypical display defects, due to a process defect such as introduction of foreign matter or formation of pinholes. However, conventional compensation circuits used to compensate for typical display defects have a configuration impossible to compensate for atypical display defects. For this reason, a compensation circuit for compensating for atypical display defects should be separately provided. Where a compensation circuit for compensating for atypical display defects and a compensation circuit for compensating for typical display defects are separately developed, it is also necessary to separately develop timing controllers in which the typical and atypical detect compensation circuits are built, respectively. In this case, accordingly, there is a problem of an increase in manufacturing costs. Furthermore, various printed circuit boards (PCBs) should be used for respective timing controllers. As a result, there is a problem in that the management of timing controllers and PCBs is complicated.

SUMMARY OF THE INVENTION

Accordingly, the present invention is directed to a video display device capable of compensating for display defects that substantially obviates one or more problems due to limitations and disadvantages of the related art.

An object of the present invention is to provide a video display device including an integrated atypical/typical defect compensation circuit capable of compensating for atypical display defects as well as typical display defects.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a video display device comprises: a display panel; a memory storing atypical/typical defect information used to compensate atypical/typical defect regions of the display panel; an integrated atypical/typical compensation circuit comprising a first compensator for compensating input data to be displayed on the atypical/typical defect regions, using the atypical/typical defect information from the memory, and a second compensator for finely compensating the data compensated by the first compensator, using first and second dithering patterns, the compensation circuit supplying data to be displayed on normal regions, without compensation; a timing controller comprising a dithering unit for finely compensating data output from the integrated atypical/typical compensation circuit, using a third dithering pattern different from the first and second dithering patterns; and a panel driver for driving the display panel under a control of the timing controller.

The memory may store the atypical/typical defect information including position information of a plurality of compensation regions divided from each of the atypical/typical defect regions, information of a plurality of grayscale ranges divided from a range of all grayscale levels, and compensation data for the plurality of compensation regions, a first control signal including a first bit representing whether or not a compensation for display defects is required, a second bit representing a type of display defects, and a third bit representing whether or not a compensation for point defects is required, a second control signal including information of a plurality of signs instructing of an addition or subtraction of the compensation data in accordance with an order of a plurality of atypical/typical defect regions, and a third control signal instructing of a dithering-on/off of the timing controller.

The first compensator may comprise a bit expander for bit-expanding the input data, and outputting the bit-expanded data, a coordinate calculator for calculating pixel coordinates of the input data, a grayscale determiner for selecting grayscale range information corresponding to the input data output from the bit expander, from among the grayscale range information from the memory, and outputting the selected grayscale range information, a position determiner for outputting position information of compensation regions corresponding to the input data and a number of detected atypical/typical defect regions, using the pixel coordinates from the coordinate calculator and the position information of the compensation regions for the atypical/typical defect regions from the memory, a compensation data selector for selecting compensation data corresponding to the input data from among the compensation data from the memory, using the grayscale range information from the grayscale determiner and the position information from the position determiner, and outputting the selected compensation data, an adder for adding the compensation data output from the compensation data selector to the input data output from the bit expander, a subtractor for subtracting the compensation data output from the compensation data selector to the input data output from the bit expander, a first multiplexer for sequentially outputting, from the memory, the information of the plural signs included in the second control signal in accordance with the detected atypical/typical defect region number output from the position determiner, and a second multiplexer for selecting an output from the adder or an output from the subtractor in accordance with the sign information output from the first multiplexer.

The coordinate calculator may comprise: a horizontal counter for detecting a number of pixels in a horizontal direction for the input data; a vertical counter for detecting a number of pixels in a vertical direction for the input data; a first coordinate calculator for outputting the pixel number input from the horizontal counter, as an x-coordinate for the input data, and outputting the pixel number input from the vertical counter, as a y-coordinate for the input data; a second coordinate calculator for outputting the pixel number input from the horizontal counter, as a y-coordinate for the input data, and outputting the pixel number input from the vertical counter, as an x-coordinate for the input data; and a multiplexer for selecting the coordinates output from the first coordinate calculator when the first control signal indicates a typical/vertical defect region, and selecting the coordinates output from the second coordinate calculator when the first control signal indicates a horizontal defect region, and supplying the selected coordinates to the position determiner.

The second compensator may comprise: a first dithering unit for executing a dithering operation for N-bit input data ("N" is a positive integer) received from the first compensator, using a first dithering pattern having an 8*32 pixel size, thereby outputting "N-3"-bit data reduced from the N-bit input data by lowermost-order 3 bits, a second dithering unit for executing a dithering operation for the N-bit input data received from the first compensator, using a second dithering pattern having a 1*1 pixel size, thereby outputting "N-1"-bit data reduced from the N-bit input data by a lowermost-order 1 bit, and a multiplexer for selecting an output from the first dithering unit when the third control signal instructs of a dithering-off of the timing controller, and selecting an output from the second dithering unit when the third control signal instructs of a dithering-on of the timing controller. The dithering unit of the timing controller may execute a dithering operation for the "N-1"-bit data, using a third dithering pattern having a 4*4 pixel size, thereby outputting "N-3"-bit data reduced from the "N-1"-bit data by lowermost-order 2 bits, and determines a fine compensation value in accordance with a combination of the second and third dithering patterns.

The timing controller may further comprise a multiplexer for selecting an output from the dithering unit or an output from the integrated atypical/typical compensation circuit in accordance with the third control signal.

The memory further stores point defect information as to point defect regions of the display panel. The integrated atypical/typical compensation circuit may further comprise a third compensator for compensating data input from the second compensator, using the point defect information from the memory.

Each of the atypical defect regions may comprise a plurality of main compensation regions horizontally divided from the atypical defect region, and a plurality of auxiliary compensation regions arranged at upper, lower, left, and right sides of the plural main compensation regions. The plural main compensation regions and the plural auxiliary compensation regions may have the same horizontal width, and may have different vertical widths set in accordance with a distribution degree of the atypical defect regions.

The position information of the plural compensation regions for each atypical defect region and the position information of the plural compensation regions for each typical defect region may be stored such that parameters of the position information for the atypical defect region and parameters of the position information for the typical defect region are unified. The video display device according to the present invention can compensate data to be displayed on an atypical defect region and/or a typical defect region, irrespective of the type of the defect region, using the integrated atypical/typical compensation circuit.

The integrated atypical/typical compensation circuit of the video display device according to the present invention compensates data, using a dither pattern selected from different dither patterns in accordance with a dithering-on/off state of the timing controller. Accordingly, the integrated atypical/typical compensation circuit can be used irrespective of whether the timing controller has a dithering function. When the timing controller is in a dithering-on state, it is possible to prevent a collision between the dithering pattern of the integrated atypical/typical compensation circuit of the liquid crystal display device and the dithering pattern of the timing controller.

In accordance with the video display device of the present invention, it is possible to store the position information of compensation regions for two typical defect regions in a memory space set to store position information of compensation regions for one atypical defect region by unifying the position information parameters of the compensation regions for one atypical defect and the position information parameters of the compensation regions for two typical defects. Accordingly, only one memory can be used to store the position information of defect regions, irrespective of the type of defects, namely, atypical defects or typical defects. Also, the same memory space can be used to store both the position information of compensation regions for atypical defects and the position information of compensation regions for typical defects. Thus, it is possible to reduce the capacity of the memory, as compared to the case in which the position information of compensation regions for atypical defects and the position information of compensation regions for typical defects are stored at different addresses or in separate memories, respectively.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
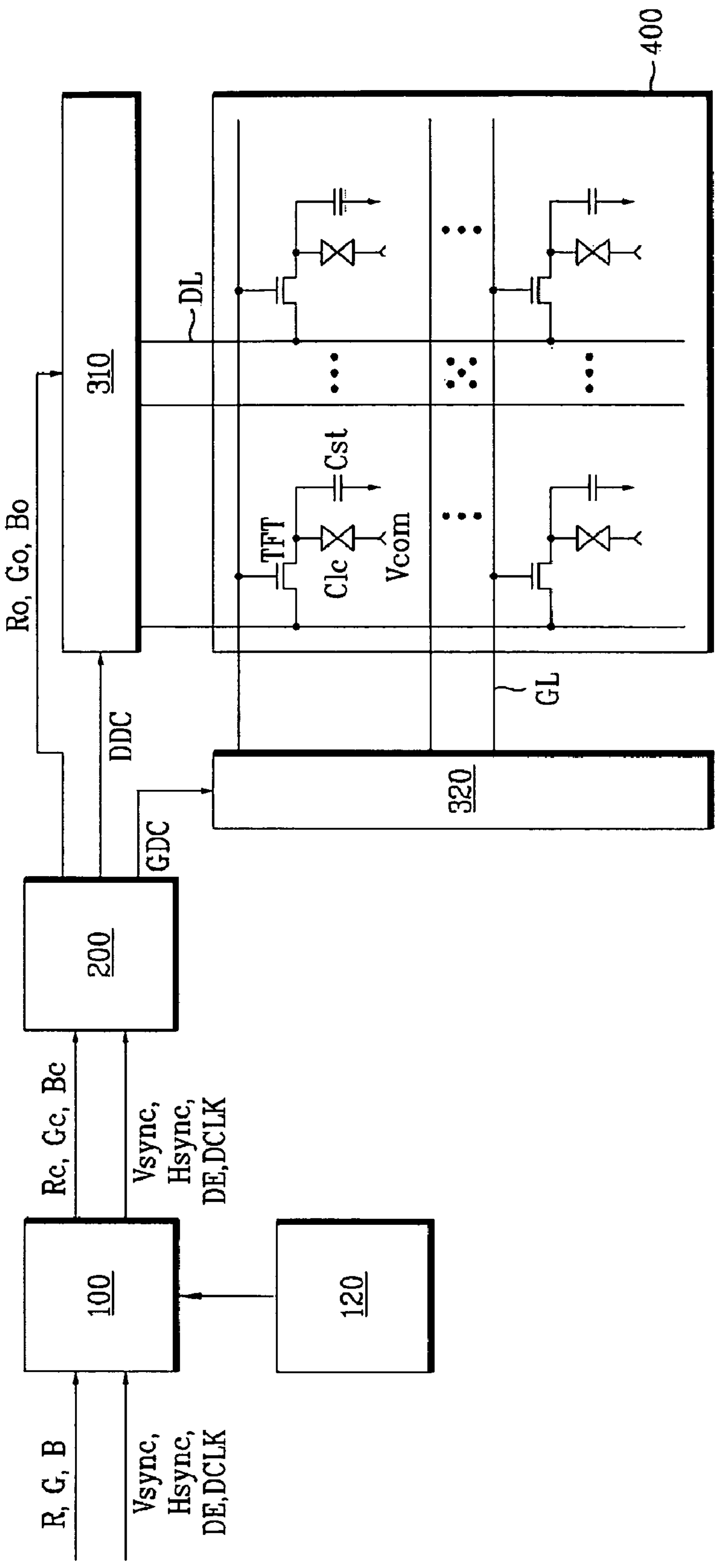
FIG. 1 is a block diagram illustrating a liquid crystal display (LCD) device according to an exemplary embodiment of the present invention.

FIG. 1 is a liquid crystal display (LCD) device including an integrated atypical/typical compensation circuit according to an exemplary embodiment of the present invention.

The LCD device shown in FIG. 1 includes an integrated atypical/typical defect compensation circuit 100 and a timing controller 200. The LCD device also includes a data driver 310 and a gate driver 320, which function to drive a liquid crystal panel 400. The LCD device further includes a memory 120 connected to the integrated atypical/typical defect compensation circuit 100. The integrated atypical/typical defect compensation circuit 100 may be built in the timing controller 200 such that they may be implemented into one semiconductor chip.

In the memory 120, display defect information is stored. The display defect information includes position information PD1, grayscale range information GD1, and compensation data CD1 as to atypical/typical display defect regions. Display defects generated in the atypical/typical display defect regions include typical defects such as vertical line defects and/or horizontal line defects, and atypical defects. Each of the typical and atypical defect regions is divided into a plurality of compensation regions. Accordingly, the atypical/typical defect region information includes position information PD1, grayscale range information GD1, and compensation data CD1 as to a plurality of compensation regions divided from each atypical/typical defect region. The position information PD1 of each compensation region is stored in the form of pixel coordinates of apexes of the compensation region, namely, x-coordinates of the apexes each representing the number of pixels in a horizontal direction and y-coordinates of the apexes each representing the number of pixels in a vertical direction. In order to simplify the configuration of the integrated atypical/typical compensation circuit 100, pixel coordinate parameters representing typical defect regions and pixel coordinate parameters representing atypical defect regions are stored in a unified state. The grayscale range information GD1 includes information as to a plurality of grayscale ranges divided in accordance with gamma characteristics. The compensation data CD1 is used to compensate for a brightness difference or color difference of each defect region from a normal region. The compensation data CD1 is stored after being sorted in accordance with the corresponding grayscale range and the position of the corresponding defect region. The memory 120 may also store point defect information including position information PD2, grayscale range information GD2, and compensation data CD2, for point defect compensation.

The integrated atypical/typical defect compensation circuit 100 receives data R, G, and B input from the outside of the LCD device, and receives a plurality of synchronizing signals Vsync, Hsync, DE, and DCLK. The integrated atypical/typical defect compensation circuit 100 compensates data to be displayed on an atypical/typical defect region, using the information PD1, GD1, and CD1 stored in the external memory 120 as to the atypical/typical defect region, and outputs the compensated data. The integrated atypical/typical defect compensation circuit 100 expands the number of bits of the input data, and applies the compensation data to the bit-expanded input data. The integrated atypical/typical defect compensation circuit 100 compensates data to be displayed the atypical/typical defect region, using compensation data optimized for each of the plural compensation regions divided from the atypical/typical defect region. The integrated atypical/typical defect compensation circuit 100 also finely compensates the compensated data by spatially and temporally distributing the compensated data, using a dithering pattern selected from different dithering patterns in accordance with dithering-on/off of the timing controller 200. The integrated atypical/typical defect compensation circuit 100 also compensates data to be displayed on a point defect region, using the information PD2, GD2, and CD2 stored in the external memory as to the point defect region, and outputs the compensated data. The integrated atypical/typical defect compensation circuit 100 then supplies the compensated data, namely, data Rc, Gc, and Bc, to the timing controller 200, together with the synchronizing signals Vsync, Hsync, DE, and DCLK. Meanwhile, the integrated atypical/typical defect compensation circuit 100 supplies, to the timing controller 200, data to be displayed on normal regions, without compensating the data.

The timing controller 200 aligns the data Rc, Gc, and Bc received from the integrated atypical/typical defect compensation circuit 100, and outputs the resultant data to the data driver 310. When the timing controller 200 is set to a dithering-on state, it finely adjusts the data Rc, Gc, and Bc in accordance with a dithering operation, aligns the dithered data, and outputs the aligned data. On the other hand, when the timing controller 200 is set to a dithering-off state, it aligns the data Rc, Gc, and Bc, without a dithering operation, and outputs the aligned data. Using the synchronizing signals Vsync, Hsync, DE, and DCLK, the timing controller 200 also generates a data control signal DDC to control the driving timing of the data driver 310 and a gate control signal GDC to control the driving timing of the gate driver 320. The timing controller 200 then outputs the data control signal DDC and gate control signal GDC.

In response to the data control signal DDC from the timing controller 200, the data driver 310 converts digital data received from the timing controller 200, namely, data Ro, Go, and Bo, to analog data, using gamma voltages. The data driver 310 outputs the analog data to data lines of the liquid crystal panel 400.

In response to the gate control signal GDC from the timing controller 200, the gate driver 320 sequentially drives gate lines of the liquid crystal panel 400.

The liquid crystal panel 400 displays an image through a pixel matrix on which a plurality of pixels are arranged. Each pixel renders a desired color, using a combination of red, green, and blue sub-pixels adjusting a light transmittance through a variation in the alignment of liquid crystals according to a data signal. Each sub-pixel includes a thin film transistor (TFT) coupled to one gate line GL and one data line DL. Each sub-pixel also includes a liquid crystal capacitor Clc and a storage capacitor Cst coupled to the TFT in parallel. The liquid crystal capacitor Clc is charged with a differential voltage between the data signal supplied to a pixel electrode via the TFT and a common voltage Vcom supplied to a common electrode, to drive liquid crystals in accordance with the charged voltage, and thus to adjust the light transmittance of the sub-pixel. Typical defect regions, atypical defect regions and point defect regions, which may be included in the liquid crystal panel 400 due to manufacture processes used, display data compensated by the integrated atypical/typical defect compensation circuit 100. As a result, it is possible to avoid a brightness difference between a normal region and a defect region, and thus to achieve an enhancement in display quality.

Figure 2:
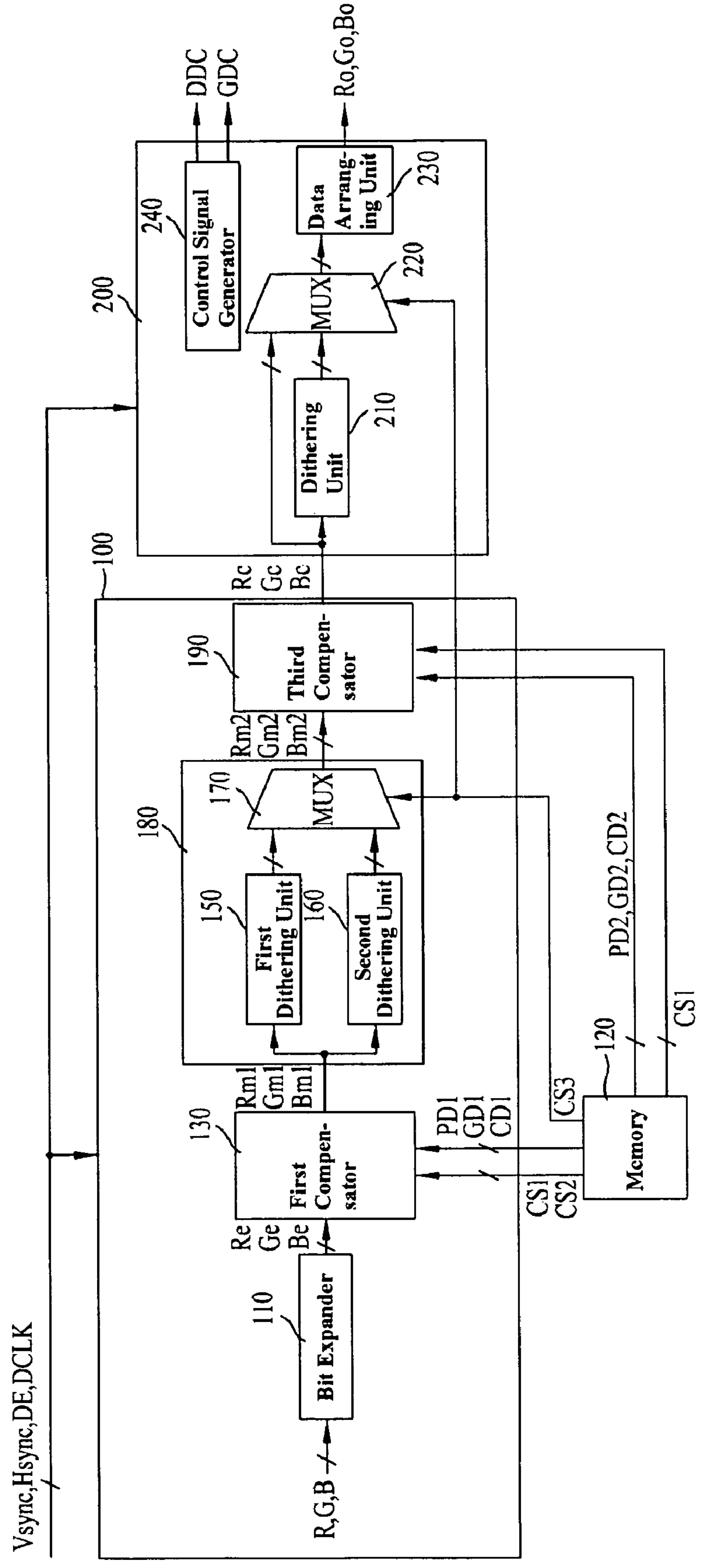
FIG. 2 is a block diagram illustrating configurations of an integrated atypical/typical compensation circuit and a timing controller shown in FIG. 1.

FIG. 2 illustrates the configurations of the integrated atypical/typical defect compensation circuit 100 and timing controller 200 shown in FIG. 1.

Figure 3A:
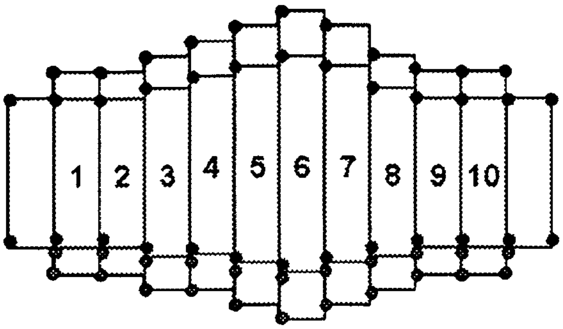
FIGS. 3A and 3B are diagrams illustrating a plurality of compensation regions for an atypical defect region and a typical defect regions, respectively.
Figure 3B:
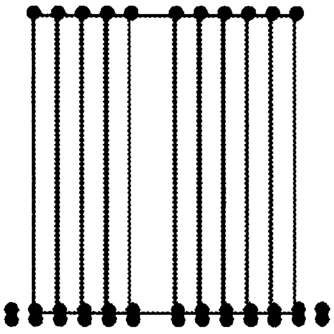
Figure 3B:
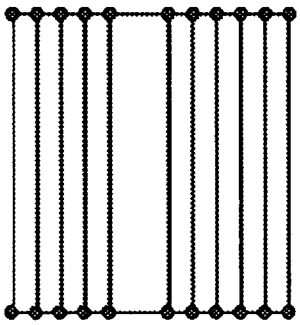

In the memory 120, the atypical/typical defect information PD1, CD1, GD1 and point defect information PD2, CD2, and GD2 are stored. Each atypical or typical defect region is divided into a plurality of compensation regions, as shown in FIG. 3A or 3B. For example, each atypical defect region may be divided into 10 main compensation regions M1 to M10 having the same width, and 22 auxiliary compensation regions S1 to S22 arranged at upper, lower, left and right sides of the main compensation regions M1 to M10 while having the same width, as shown in FIG. 3A. On the other hand, each typical defect region may be divided into one main compensation region 5, and 9 auxiliary compensation regions 1 to 4 and 6 to 10 arranged at left and right sides of the main compensation region 5, as shown in FIG. 3B. The number of compensation regions is determined in accordance with a distribution degree of defect regions. As the position information PD1 of atypical and typical defects, position information of each compensation region is stored in the form of pixel coordinates of apexes of the compensation region, namely, x-coordinates of the apexes each representing the number of pixels in a horizontal direction and y-coordinates of the apexes each representing the number of pixels in a vertical direction. Pixel coordinate parameters representing typical defect regions and pixel coordinate parameters representing atypical defect regions are stored in a unified state. In this case, it is possible to store position information of compensation regions for two typical defect regions in a memory space set to store position information of compensation regions for one atypical defect region. This will be described later. The plural compensation regions divided from each typical vertical line defect region as shown in FIG. 3B have the same y-coordinates, so that they may be set, using only the x-coordinates thereof. However, both the x and y-coordinates of the compensation regions are stored, in order to unify the position information and parameters thereof with those of each atypical defect region as shown in FIG. 3A. On the other hand, the pixel coordinates of the plural compensation regions divided from each typical horizontal line defect region are stored under the condition in which the number of pixels in a horizontal direction is stored as a y-coordinate, and the number of pixels in a vertical direction is stored as an x-coordinate, in order to unify the parameters of the pixel coordinates with those of the plural compensation regions divided from each typical vertical line defect region. The grayscale range information GD1 includes information as to a plurality of grayscale ranges divided in accordance with gamma characteristics. The compensation data CD1 is used to compensate for a brightness difference or color difference of each defect region from a normal region. The compensation data CD1 is stored after being sorted in accordance with the corresponding grayscale range and the position of the corresponding defect region.

The memory 120 may also store the first control information CS1 which includes a first bit representing whether or not a compensation for display defects is required, a second bit representing the type of display defects, and a third bit representing whether or not a compensation for point defects is required. For example, when the first bit of the first control signal CS1 is "1", the first control signal CS1 instructs of a compensation-off for display defects. When the first bit of the first control signal CS1 is "0", the first control signal CS1 instructs of a compensation-on for display defects. When the second bit of the first control signal CS1 is "1", the first control signal CS1 instructs of a compensation-off for an atypical/vertical defect region. When the second bit of the first control signal CS1 is "0", the first control signal CS1 instructs of a compensation for a horizontal defect region. When the third bit of the first control signal CS1 is "1", the first control signal CS1 instructs of a compensation-off for point defects. When the third bit of the first control signal CS1 is "0", the first control signal CS1 instructs of a compensation-on for point defects. The first control information CS1 may also be set by values of three option pins included in the timing controller 200, in which the integrated atypical/typical defect compensation circuit 100 is built.

The memory 120 may store the second control information CS2 which includes information as to a plurality of signs arranged in accordance with the order of a plurality of atypical/typical defect regions, to instruct of an addition (+) or subtraction (−) of compensation data for the plural atypical/typical defect regions in accordance with whether each of the atypical/typical defect regions has bright or dark defects. For example, the sign information for atypical defect regions is assigned 2 bits per one defect region. The sign information for typical defect regions is assigned 1 bit per one defect region. This is because it is possible to store position information of two typical defect regions in a memory space set to store position information of one atypical defect region.

In the memory 120, a third control signal CS3 instructing of a dithering-on/off of the timing controller 200 may also be stored. The third control signal CS3 may be input from an external system.

As shown in FIG. 2, the integrated atypical/typical defect compensation circuit 100 includes a bit expander 110, a first compensator 130 for compensating data of an atypical/typical defect region included in data Re, Ge, and Be input from the bit expander 110, a second compensator 180 for dithering the compensated data input from the first compensator 130, namely data Rm1, Gm1, and Bm1, using different dithering patterns, and a third compensator 190 for compensating data of a point defect region included in data Rm2, Gm2, and Bm2 output from the second compensator 180. When the first control signal CS1 instructs of a compensation for a defect region, the integrated atypical/typical compensation circuit 100 compensates input data to be displayed on the defect region, using the first and second compensators 130 and 180. On the other hand, when the first control signal CS1 instructs of a compensation for a point defect region, the integrated atypical/typical compensation circuit 100 compensates input data to be displayed on the point defect region, using the third compensator 190. When the first control signal CS1 instructs of a compensation-off for a defect region, the first and second compensators 130 and 180 bypass the input data without data compensation. When the first control signal CS1 instructs of a compensation-off for point defects, the third compensator 190 bypasses the input data without data compensation. The first, second, and third compensators 130, 180, and 190 bypass data to be displayed on normal regions, even when the first control signal CS1 instructs of a compensation for defect regions and/or a compensation for point defects. The following description will be given, only in conjunction with the case in which the first control signal CS1 instructs of a compensation for defect regions and a compensation for point defects.

The bit expander 110 of the integrated atypical/typical defect compensation circuit 100 bit-expands input data R, G, and B received from the outside of the LCD device, and supplies the bit-expanded data to the first compensator 130. For example, the bit expander 110 adds one bit ("0") to the lowermost-order bit of 10-bit input data, to bit-expand the input data to 11-bit data. The bit expander 110 then supplies the 11-bit data, namely, the data Re, Ge, and Be, to the first compensator 130.

The first compensator 130 compensates the input data Re, Ge, and Be, which will be displayed on an atypical/typical defect region, using the first control signal CS1 and atypical/typical defect information PD1, GD1, and CD1 supplied from the memory 120, and outputs the compensated data. The first compensator 130 reads the atypical/typical defect information PD1, GD1, and CD1 from the memory 120, to determine whether or not the input data Re, Ge, and Be will be displayed on an atypical/typical defect region. When it is determined that the input data Re, Ge, and Be will be displayed on an atypical/typical defect region, the first compensator 130 discriminates information as to respective grayscale ranges for the input data Re, Ge, and Be. Thereafter, the first compensator 130 selects compensation data corresponding to the discriminated atypical/typical defect region position and grayscale range information. Using the second control signal CS2 supplied from the memory 120, the first compensator 130 then executes a data compensation by adding or subtracting the selected compensation data to or from the input data Re, Ge, and Be. Thus, the first compensator 130 compensates the input data Re, Ge, and Be for the typical defect region, and outputs the compensated data. For example, the first compensator 130 adds or subtracts, to or from each of the 11-bit input data Re, Ge, and Be for the atypical/typical defect region, the corresponding 8-bit compensation data, and outputs the compensated data. A detailed configuration of the first compensator 130 will be described later.

The second compensator 180 finely compensates the compensated data Rm1, Gm1, and Bm1 output from the first compensator 130, using a dithering method selected from different dithering methods in accordance with the third control signal CS3 instructing of dithering-on/off. For this function, the second compensator 180 includes a first dithering unit 150, a second dithering unit 160, and a multiplexer (MUX) 170.

The first dithering unit 150 can be applied to the case in which the timing controller 600 does not execute a dithering operation, namely, the timing controller 600 is in a dithering-off state. For this function, the first dithering unit 150 executes a fine brightness compensation by spatially and temporally distributing the compensated data Rm1, Gm1, and Bm1 output from the first compensator 130, using a first dithering pattern. For example, the first dithering unit 150 has a plurality of first dithering patterns each having an 8*32 pixel size. The first dithering patterns are set to have different numbers of pixels having a dither value of "1", respectively. Also, even the first dithering patterns, which are applied to different frames, respectively, while having the same grayscale level, are different from each other in terms of the positions of the pixels having a dither value of "1". A detailed configuration of the first dithering unit 150 will be described later.

The second dithering unit 160 can be applied to the case in which the timing controller 600 executes a dithering operation. For this function, the second dithering unit 160 executes a fine brightness compensation by temporally distributing the compensated data Rm1, Gm1, and Bm1 output from the first compensator 130, using a second dithering pattern capable of preventing a collision thereof with a third dithering pattern of a dithering unit 210 built in the timing controller 200. For example, the second dithering unit 160 uses a second dithering pattern having a 1*1 pixel size. The second dithering pattern has a dither value of "1" or "0". The dither values of "1" and "0" alternate by frames. Accordingly, the second compensator 180 discards the lowermost-order bit in the 11 bits of each of the data Rm1, Gm1, and Bm1 in a first frame, and then adds a dither value of "1" or "0" to the lowermost-order bit of the remaining 10 bits. Thus, the second compensator 180 outputs compensated data Rm2, Gm2, and Bm2 each consisting of 10 bits. In a second frame, the second compensator 180 discards the lowermost-order bit of the 11 bits, adds a dither value reciprocal to that of the first frame to the lowermost-order bit of the remaining 10 bits, and then outputs compensated data Rm2, Gm2, and Bm2 each consisting of 10 bits. As a result, the 10-bit data output in the first frame and the 10-bit data in the second frame have a grayscale level difference of "1" when the lowermost-order bit of the 11-bit input data has an odd grayscale level of "1". On the other hand, the 10-bit data output in the first frame and the 10-bit data in the second frame have the same grayscale level when the lowermost-order bit of the 11-bit input data has an even grayscale level of "0". A detailed configuration of the second compensator 180 will be described later.

The MUX 170 selects an output from the first dithering unit 150 when the third control information CS3 instructs of the dithering-off of the timing controller 600, and selects an output from the second dithering unit 160 when the third control information CS3 instructs of the dithering-on of the timing controller 600.

When the first control signal CS1 instructs of a point defect compensation, the third compensator 190 compensates the data Rm2, Gm2, and Bm2, which will be displayed on a point defect region, using the point defect information PD2, GD2, and CD2 stored in the memory 120. For data of normal regions, the third compensator 190 outputs the data without any data compensation. A detailed configuration of the third compensator 190 will be described later.

The timing controller 200 includes a dithering unit 210 for dithering the data Rc, Gc, and Bc input from the integrated atypical/typical defect compensation circuit 100, an MUX 220 for selectively outputting the data passing through the dithering unit 210 or the data bypassing the dithering unit 210, a data arranging unit 230 for re-aligning the data output from the MUX 220, and outputting the resultant data to the data driver 310 shown in FIG. 1, and a control signal generator 240 for generating the data control signal DDC and the gate control signal GDC, and outputting the generated data control signal DDC and gate control signal GDC to the data driver 310 and gate driver 320, respectively.

The dithering unit 210 of the timing controller 200 executes a fine brightness compensation by spatially and temporally distributing the data Rc1, Gc1, and Bc1 output from the compensation circuit 100, using a third dithering pattern. The dithering unit 210 uses the third dithering pattern to prevent a collision thereof with the second dithering pattern used in the second compensator 180. For example, the dithering unit 210 uses a plurality of third dithering patterns each having a 4*4 pixel size. The third dithering patterns correspond to different grayscale levels, respectively, and are different in terms of the number and positions of pixels having a dither value of "1". The dithering unit 210 separates the 10 bits of each of the data Rc1, Gc1, and Bc1 input from the compensation circuit 100 into the lower-order 2 bits and the remaining 8 bits. Thereafter, the dithering unit 210 selects a second dither value of "1" or "0" from the second dithering pattern selected in accordance with the grayscale level of the separated lower-order 2 bits, and adds the selected second dither value to the lowermost-order bit of the remaining 8 bits. Thus, the dithering unit 210 outputs compensated data Rc2, Gc2, and Bc2 each consisting of 8 bits. When the 10-bit data output in the first frame and the 10-bit data in the second frame have a grayscale level difference of "1" because the data input to the second dithering unit 160 of the compensation circuit 500 has an odd grayscale level of "1", the lower-order 2 bits of the data input to the dithering unit 210 in the first frame is different from that of the second frame. In this case, accordingly, dither values are selected from second dithering patterns corresponding to the grayscale levels of the two different lower-order 2 bits, respectively. Thus, a fine brightness compensation is executed, using a combination of the second dithering pattern used in the second dithering unit 160 of the second compensator 180 and the third dithering pattern used in the dithering unit 210 of the timing controller 200. The dithering unit 210 will be described in detail later.

The MUX 220 selects the data Rc1, Gc1, and Bc1 directly input from the compensation unit 100 without passing through the dithering unit 210 when the third control information CS3 from the memory 120 instructs of the dithering-off of the timing controller 600. The MUX 220 outputs the selected data Rc1, Gc1, and Bc1 to the data arranging unit 230. On the other hand, when the third control information CS3 instructs of the dithering-on of the timing controller 600, the MUX 220 selects the Rc2, Gc2, and Bc2 output from the second dithering unit 160. The MUX 220 outputs the selected data Rc2, Gc2, and Bc2 to the data arranging unit 230.

The data arranging unit 230 aligns the input data from the MUX 220, and outputs the aligned data, namely, data Ro, Go, and Bo, to the data driver 310 shown in FIG. 1.

The control signal generator 240 generates the data control signal DDC and the gate control signal GDC, and outputs the generated data control signal DDC and gate control signal GDC to the data driver 310 and gate driver 320, respectively.

Figure 4:
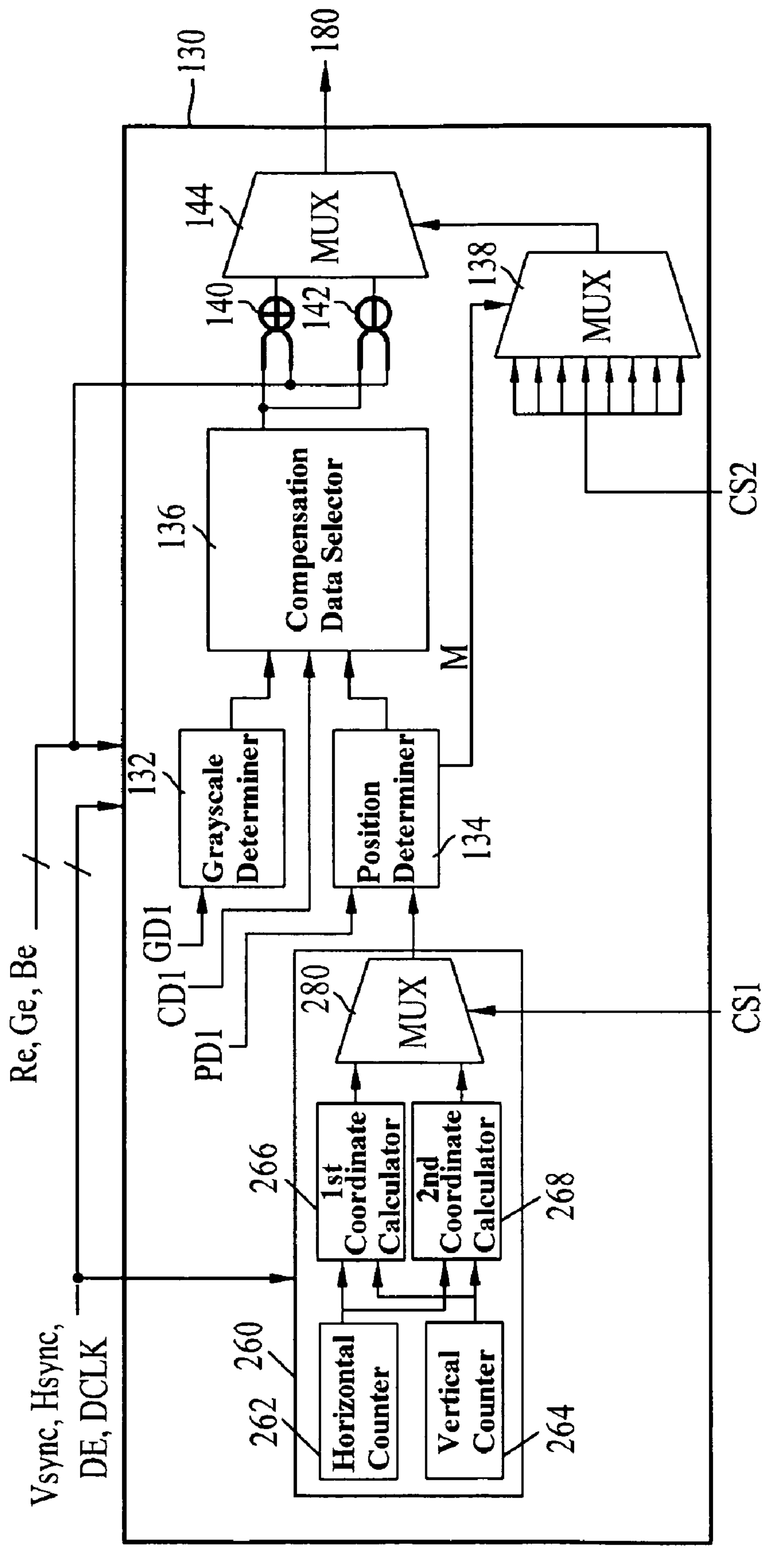
FIG. 4 is a block diagram illustrating a configuration of a first compensator shown in FIG. 2.

FIG. 4 is a block diagram illustrating a configuration of the first compensator 130 shown in FIG. 2.

As shown in FIG. 4, the first compensator 130 compensates the input data Re, Ge, and Be, which will be displayed on an atypical/typical defect region, using the atypical/typical defect information PD1, GD1, and CD1 stored in the memory 120, and outputs the compensated data. For this function, the first compensator 130 includes a coordinate calculator 260, a grayscale determiner 132, a position determiner 134, a compensation data selector 136, an adder 140, a subtractor 142, and MUXs 138 and 144.

The grayscale determiner 132 analyzes respective grayscale levels of the input data Re, Ge, and Be, selects grayscale range information corresponding to the input data Re, Ge, and Be from among the grayscale range information GD1 read from the memory 120, based on the analyzed grayscale levels, and outputs the selected grayscale range information to the compensation data selector 136. The grayscale range information GD1 may include 6 grayscale range information pieces respectively corresponding to 6 grayscale ranges divided from a 256 grayscale range in accordance with gamma characteristics (a first grayscale range from 30 to 70, a second grayscale range from 71 to 120, . . . ). Alternatively, the grayscale range information GD1 may include 8 grayscale range information pieces respectively corresponding to 8 grayscale ranges divided from the 256 grayscale range. The grayscale determiner 132 selects grayscale range information including respective grayscale levels of the input data Re, Ge, and Be from among the plural grayscale range information pieces, and outputs the selected grayscale range information to the compensation data selector 136.

The coordinate calculator 260 calculates pixel coordinates x and y of the input data Re, Ge, and Be, using the vertical synchronizing signal Vsync, horizontal synchronizing signal Hsync, data enable signal DE, and dot clock DCLK. For this function, the coordinate calculator 260 includes a horizontal counter 262, a vertical counter 264, a first coordinate calculator 266, a second coordinate calculator 268, and an MUX 280.

The horizontal counter 262 counts pulses of the dot clock DCLK in an enable period of the data enable signal DE, and outputs the resultant count value as the number of pixels in a horizontal direction, for each of the input data Re, Ge, and Be.

The vertical counter 264 counts pulses of the horizontal synchronizing signal Hsync in a period in which both the vertical synchronizing signal Vsync and the data enable signal DE are enabled, and outputs the resultant count value as the number of pixels in a vertical direction, for each of the input data Re, Ge, and Be.

The first coordinate calculator 266 outputs the pixel number input from the horizontal counter 262, as an x-coordinate, for each of the input data Re, Ge, and Be. The first coordinate calculator 266 also outputs the pixel number input from the vertical counter 268, as a y-coordinate, for each of the input data Re, Ge, and Be.

The second coordinate calculator 268 outputs the pixel number input from the horizontal counter 262, as a y-coordinate, for each of the input data Re, Ge, and Be. The second coordinate calculator 268 also outputs the pixel number input from the vertical counter 268, as an x-coordinate, for each of the input data Re, Ge, and Be.

The MUX 280 outputs the pixel coordinates x and y from the first coordinate calculator 266 or the pixel coordinates x and y from the second coordinate calculator 268, for each of the input data Re, Ge, and Be. When the first control signal CS1 instructs of an atypical/vertical defect region compensation, the MUX 280 outputs the pixel coordinates x and y, for each of the input data Re, Ge, and Be from the first coordinate calculator 266. On the other hand, when the first control signal CS1 instructs of a horizontal defect region compensation, the MUX 280 outputs the pixel coordinates x and y from the second coordinate calculator 268, for each of the input data Re, Ge, and Be.

The position determiner 134 compares the pixel coordinates x and y output from the coordinate calculator 260, for each of the input data Re, Ge, and Be, with the position information PD1 supplied from the memory 120 as to atypical/typical defect regions. When it is determined, based on the result of the comparison, that an atypical/typical defect region has been detected. In this case, the position determiner 134 selects the position information of the defect region corresponding to the input data Re, Ge, and Be, and outputs the selected position information to the compensation data selector 136. Since the atypical/typical defect region is divided into a plurality of main compensation regions and a plurality of auxiliary compensation regions, the position information PD1 of the atypical/typical defect region includes the position information of each of the main and auxiliary compensation regions. Accordingly, the position determiner 134 selects and outputs the position information of the compensation region corresponding to the pixel coordinates x and y for each of the input data Re, Ge, and Be, from among the position information of the plural compensation regions, and outputs the selected position information. The position determiner 134 also counts the number of detected atypical/typical defect regions, M, and outputs the resultant count value to the MUX 138.

The compensation data selector 136 outputs the position information of the compensation region selected by the position determiner 134. The compensation data selector 136 also selects compensation data associated with the input data Re, Ge, and Be, from among the compensation data CD1 supplied from the memory 120, in response to the grayscale range information selected by the grayscale determiner 132. The compensation data selector 136 selects compensation data in a grayscale range associated with the input data Re, Ge, and Be, in accordance with each position of the main and auxiliary compensation regions of the atypical/typical defect region, and outputs the selected compensation data.

The adder 140 adds the compensation data output from the compensation data selector 136 to the input data Re, Ge, and Be, and outputs the resultant data. The subtractor 142 subtracts the compensation data output from the compensation data selector 136 from the input data Re, Ge, and Be, and outputs the resultant data.

The MUX 138 sequentially outputs sign information + and – stored in the memory 120 in an order of the multiple atypical/typical defect regions, in response to the number of detected atypical/typical defect regions, M, to control the MUX 144 which selects an output from the adder 140 or an output from the subtractor 142. The MUX 144 selects the output from the adder 140 or the output from the subtractor 142 in accordance with the sign information supplied from the MUX 138, and supplies the selected output to the second compensator 180.

Figure 5:
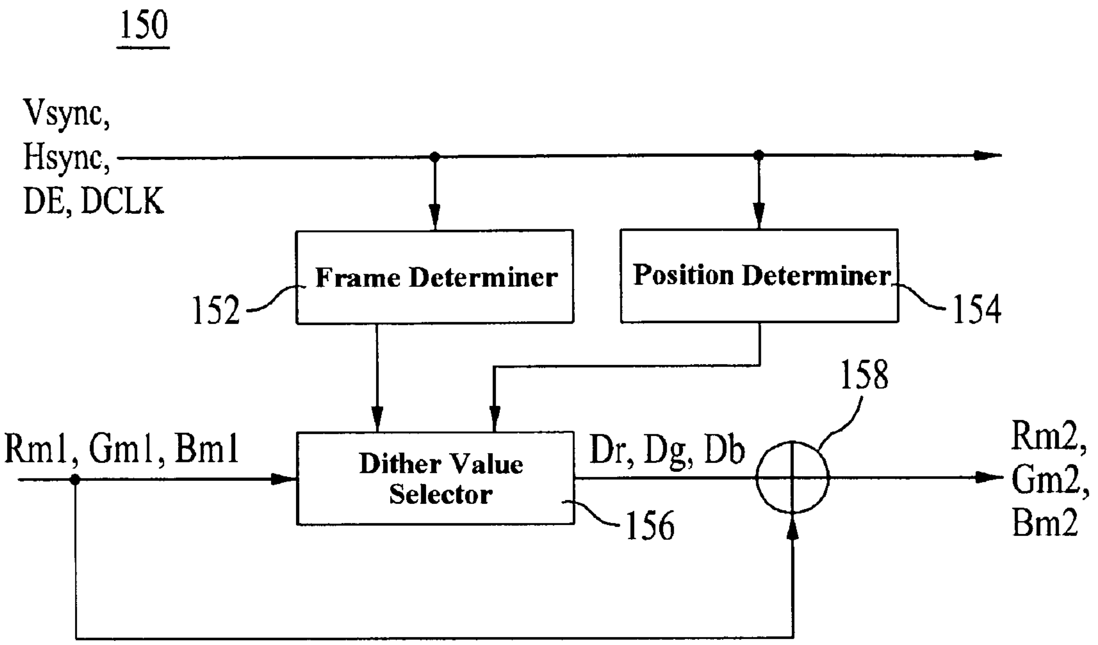
FIG. 5 is a block diagram illustrating a configuration of a first dithering unit shown in FIG. 4.
Figure 6A:
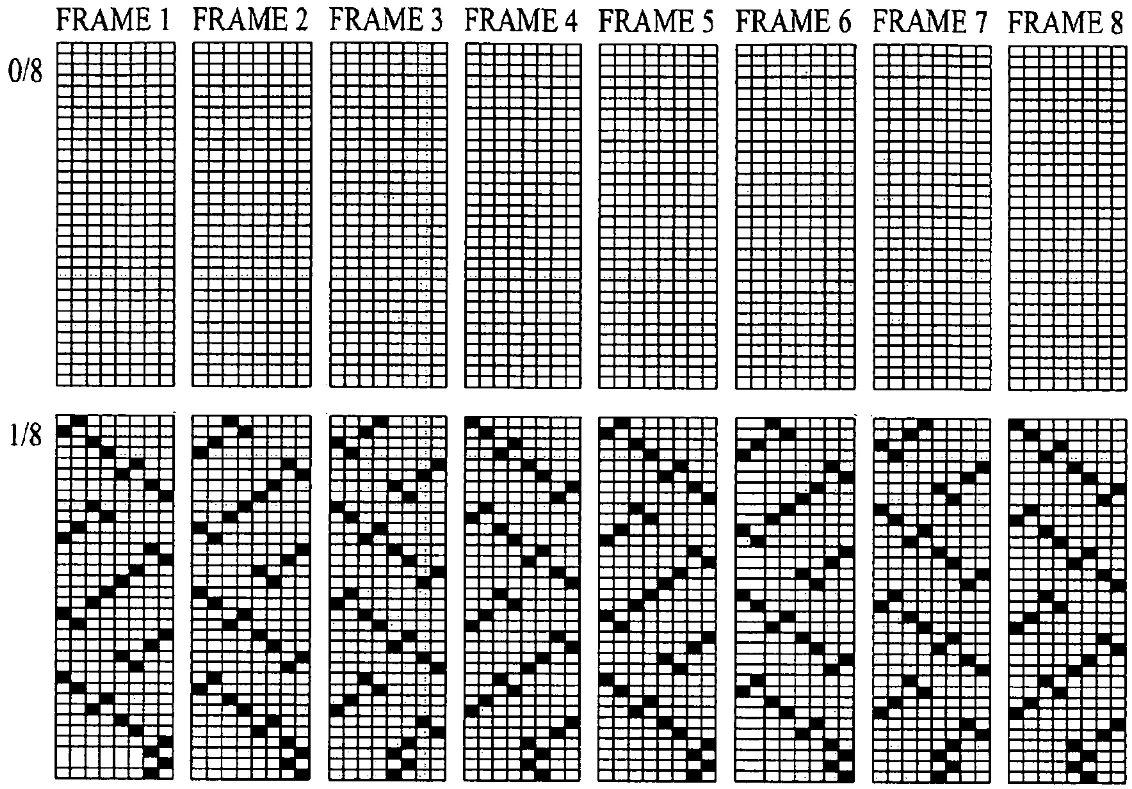
FIGS. 6A to 6D are diagrams illustrating a plurality of dithering patterns each having an 8*32 pixel size while being stored in a dither value selector shown in FIG. 5.
Figure 6B:
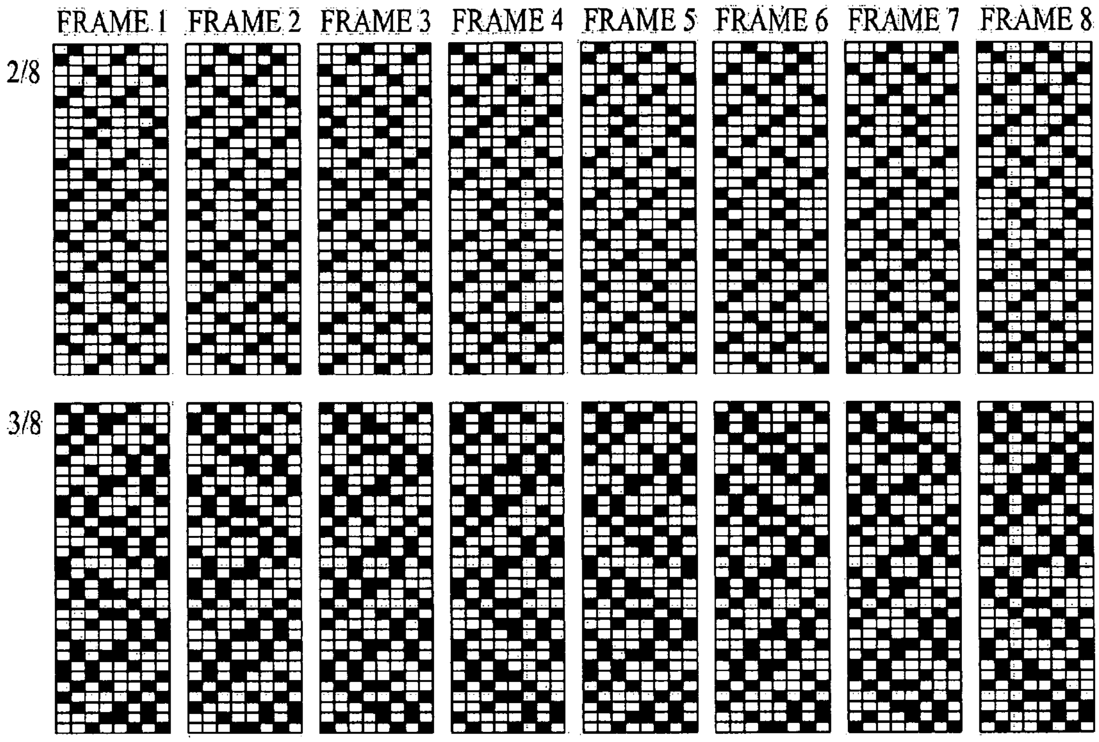
Figure 6C:
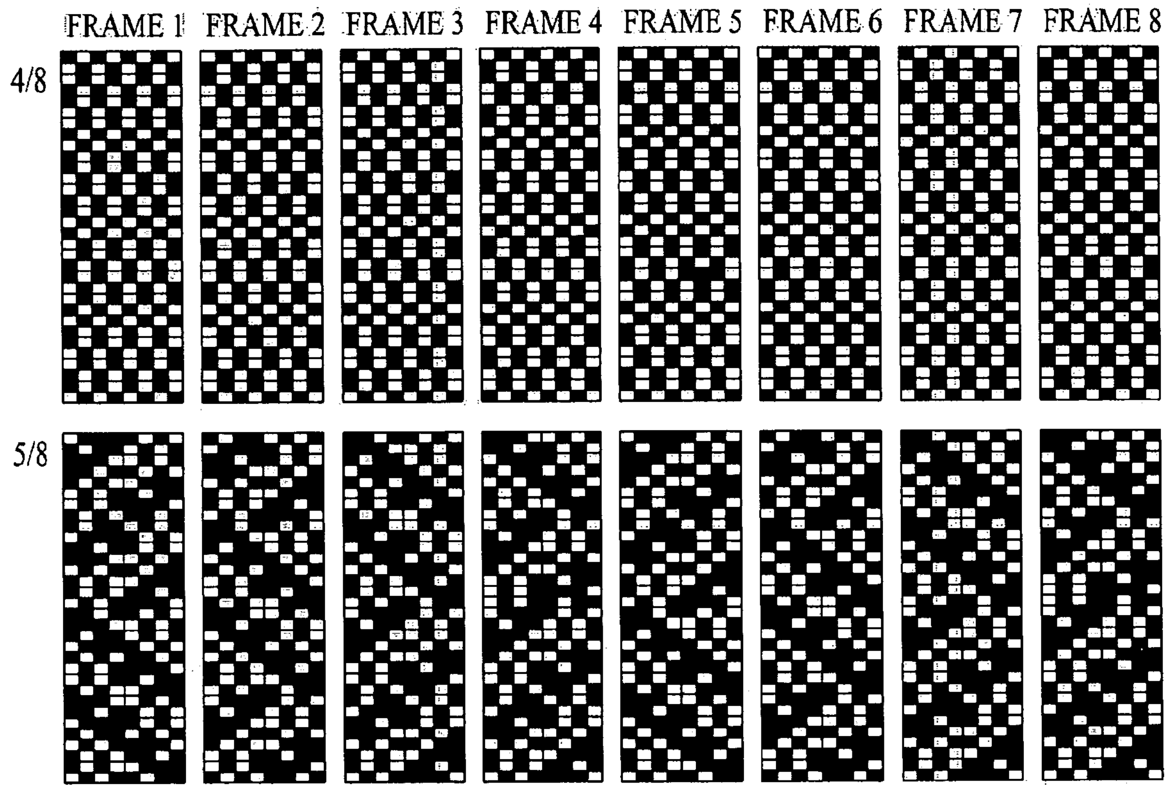
Figure 6D:
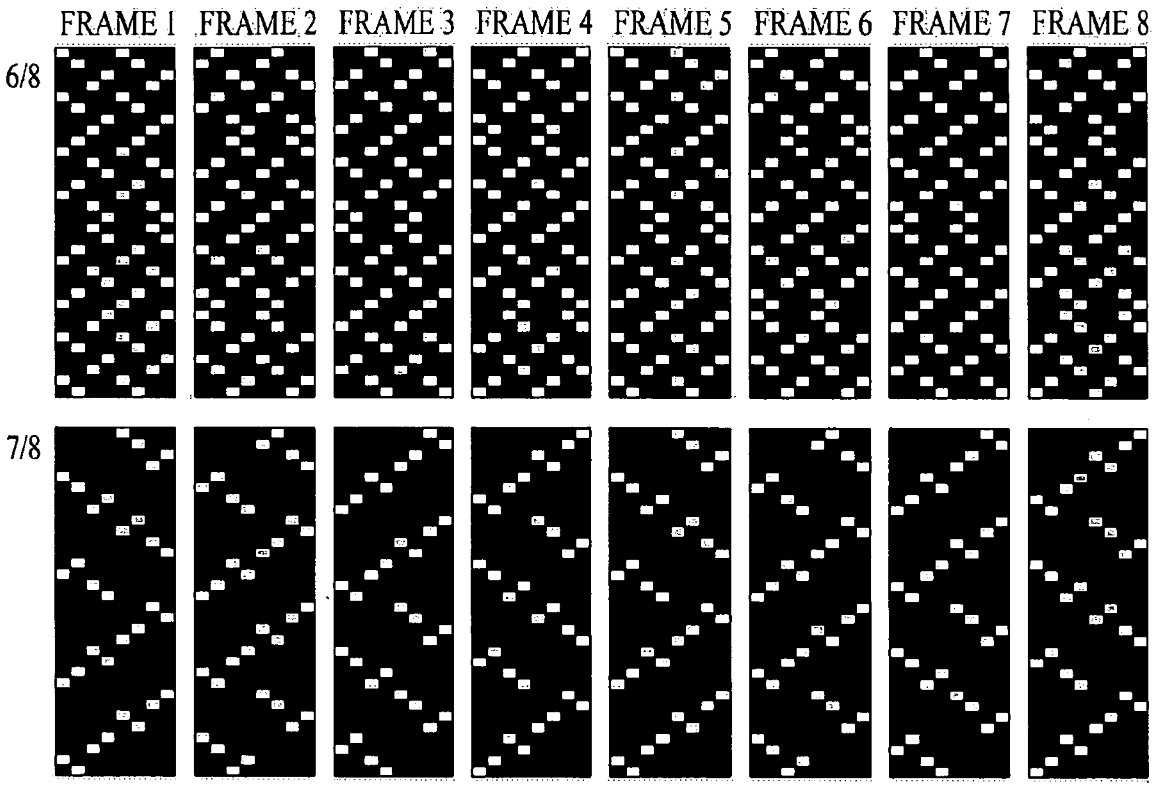

FIG. 5 is a block diagram illustrating a configuration of the first dithering unit 150 in the second compensator 180. FIGS. 6A to 6D illustrate a plurality of dithering patterns each having an 8*32 pixel size.

As shown in FIG. 5, the first dithering unit 150 includes a frame determiner 152, a position determiner 154, a dither value selector 156, and an adder 158. The dither value selector 156 has a plurality of first dithering patterns each having an 8*32 pixel size, so that the first dithering unit 150 can be applied to the case in which the timing controller 600 does not perform a dithering operation, namely, the timing controller 600 is in a dithering-off state.

The frame determiner 152 counts pulses of the vertical synchronizing signal Vsync selected from among the plural synchronizing signals Vsync, Hsync, DE, and DCLK, to detect the number of frames. The frame determiner 152 outputs information representing the number of detected frames to the dither value selector 156.

The position determiner 154 detects respective horizontal positions of the input data Rm1, Gm1, and Bm1 while counting pulses of the dot clock DCLK in an enable period of the data enable signal DE, and detects respective vertical positions of the input data Rm1, Gm1, and Bm1 while counting pulses of the horizontal synchronizing signal Hsync in a period in which both the vertical synchronizing signal Vsync and the data enable signal DE are enabled. The position determiner 154 outputs information representing the detected pixel positions to the dither value selector 156.

The dither value selector 156 selects desired dither values Dr, Dg, and Db from among a plurality of dithering patterns, using the grayscale levels corresponding to respective lower-order 3 bits of the data Rm1, Gm1, and Bm1 compensated by the first compensator 130, the frame number information input from the frame determiner 152, and the pixel position information input from the position determiner 154. The dither value selector 156 then outputs the selected dither values Dr, Dg, and Db.

For example, as shown in FIGS. 6A to 6D, the dither value selector 156 stores a plurality of dithering patterns each having an 8*32 pixel size, in the form of a look-up table. The dithering patterns are arranged to have gradually-increased numbers of pixels having a dither value of “1” (black) in accordance with grayscale levels of “0”, “1/8”, “2/8”, “3/8”, “4/8”, “5/8”, “6/8”, “7/8”, and “1”, respectively (the dithering pattern having a grayscale level of 1 is not shown). A plurality of dithering patterns, in which the positions of pixels having a dither value of “1” are different by frames even for the same grayscale level, may also be stored. In other words, the dither value selector 156 stores a plurality of dithering patterns, which are different by grayscale levels and frames. The size of the dithering patterns and the positions of pixels having a dither value of “1” in each dithering pattern may be varied in accordance with a designer’s desire. Since the data compensated by the first compensator 130, namely, the data Rm1, Gm1, and Bm1, is spatially and temporally distributed, using the above-described dithering patterns, it is possible to finely compensate for the brightness difference of the atypical/typical defect region.

Figure 7:
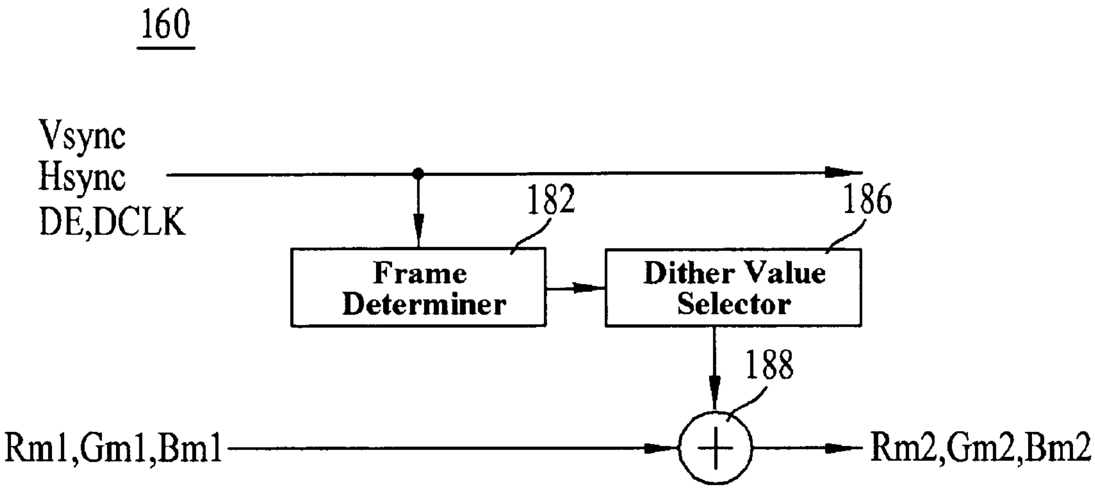
FIG. 7 is a block diagram illustrating a configuration of a second dithering unit in a second compensator shown in FIG. 2.

FIG. 7 is a block diagram illustrating a configuration of the second dithering unit 160 in the second compensator 180 shown in FIG. 2.

As shown in FIG. 7, the second compensator 180 includes a frame determiner 182, a dither value selector 186, and an adder 188.

The frame determiner 182 counts pulses of the vertical synchronizing signal Vsync selected from the plural synchronizing signals Vsync, Hsync, DE, and DCLK, to detect whether the current frame is an odd frame or an even frame. The frame determiner 182 outputs the detected frame information to the dither value selector 186.

The dither value selector 186 selects a dither value of “1” or “0” from a first dithering pattern, which has a 1*1 pixel size, using the frame information received from the frame determiner 182, and outputs the selected dither value. The dither value selector 186 alternately outputs dither values of “1” and “0” by frames.

The adder 188 discards the lowermost-order bit in the 11 bits of each of the data Rm1, Gm1, and Bm1 input from the first compensator 130 in a first frame, and then adds a first dither value of “1” or “0” selected by the dither value selector 186 to the lowermost-order bit in the remaining 10 bits. Thus, the adder 188 outputs 10-bit compensated data Rm2, Gm2, and Bm2. In a second frame, the adder 188 discards thee lowermost-order bit of the 11 bits, and adds a first dither value reciprocal to that of the first frame to the lowermost-order bit of the remaining 10 bits, and then outputs the resultant 10-bit compensated data Rm2, Gm2, and Bm2. As a result, the 10-bit data output in the odd frame (first frame) and the 10-bit data in the even frame (second frame) have a grayscale level difference of “1” when the lowermost-order bit of the 11-bit input data has an odd grayscale level of “1”. On the other hand, the 10-bit data output in the first frame and the 10-bit data in the second frame have the same grayscale level when the lowermost-order bit of the 11-bit input data has an even grayscale level of “0”.

Figure 8:
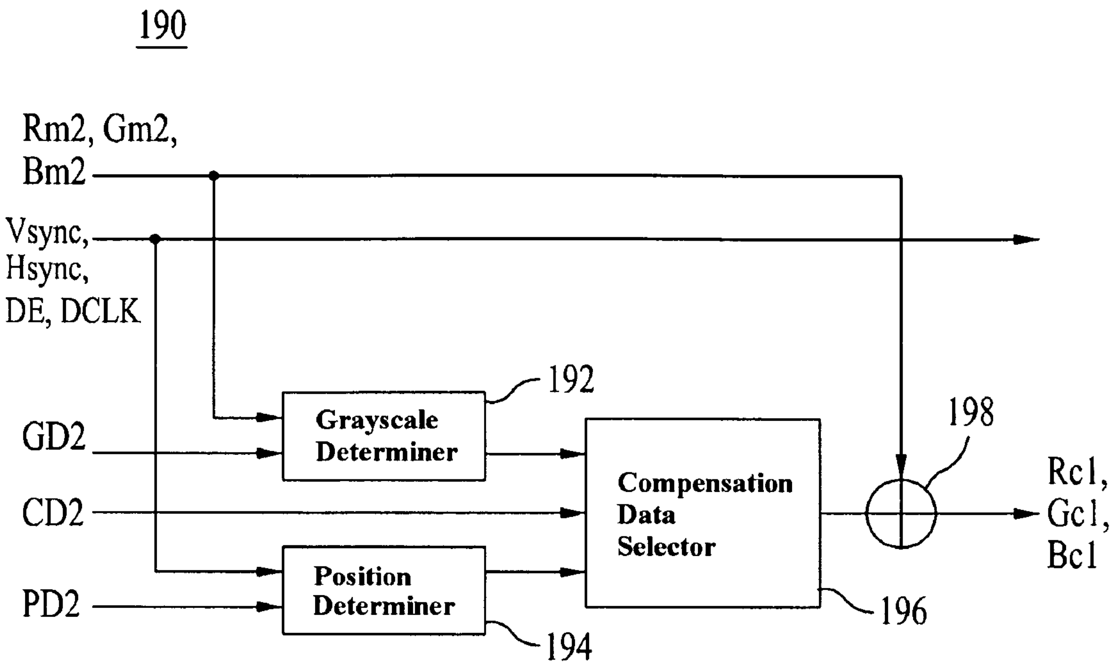
FIG. 8 is a block diagram illustrating a third compensator shown in FIG. 2.

FIG. 8 illustrates the third compensator 190 shown in FIG. 2.

As shown in FIG. 8, the third compensator 190 includes a grayscale determiner 192, a position determiner 194, a compensation data selector 196, and a calculator 198.

The grayscale determiner 192 analyzes respective grayscale levels of the input data Rm2, Gm2, and Bm2 to be supplied to a link pixel of a point defect region, selects grayscale range information corresponding to respective input data Rm2, Gm2, and Bm2 from among the grayscale range information GD2 read from the memory 120, based on the analyzed grayscale levels, and outputs the selected grayscale range information to the compensation data selector 196.

The position determiner 194 determines respective pixel positions of the input data Rm2, Gm2, and Bm2, using at least one of the vertical synchronizing signal Vsync, horizontal synchronizing signal Hsync, data enable signal DE, and dot clock DCLK. For example, the position determiner 194 determines respective horizontal pixel positions of the input data Rm2, Gm2, and Bm2 while counting pulses of the dot clock DCLK in an enable period of the data enable signal DE, and determines respective vertical pixel positions of the input data Rm2, Gm2, and Bm2 while counting pulses of the horizontal synchronizing signal Hsync in a period in which both the vertical synchronizing signal Vsync and the data enable signal DE are enabled. The position determiner 194 then compares the determined pixel positions of the input data Rm2, Gm2, and Bm2 with the point defect region position information PD2 read from the memory 120, to determine whether or not the current region is a point defect region. When the current region is detected as a point defect region, the position determiner 194 outputs information representing the determined pixel positions to the compensation data selector 196.

The compensation data selector 196 selects compensation data corresponding to each of the input data Rm2, Gm2, and Bm2 from among the compensation data CD2 read from the memory 120 in response to the grayscale range information selected by the grayscale determiner 192 and the position information selected by the position determiner 194. The compensation data selector 196 then outputs the selected compensation data.

The calculator 198 adds or subtracts the compensation data output from the compensation data selector 196 to or from the input data Rm2, Gm2, and Bm2, and outputs the resultant data.

Figure 9:
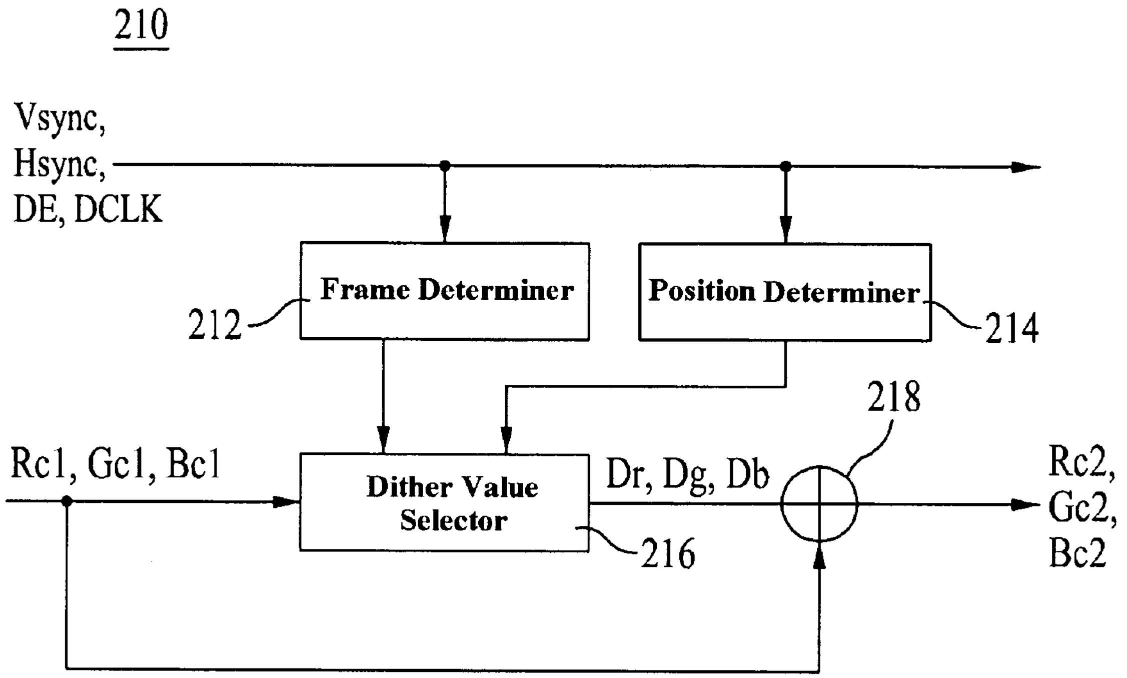
FIG. 9 is a block diagram illustrating a configuration of a dithering unit included in the timing controller shown in FIG. 2.
Figure 10:
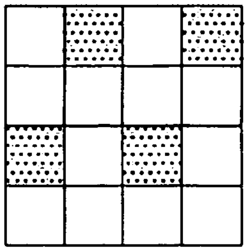
FIG. 10 is a diagram illustrating third dithering patterns each having a 4*4 pixel size while being stored in the dither value selector shown in FIG. 9.
Figure 10:
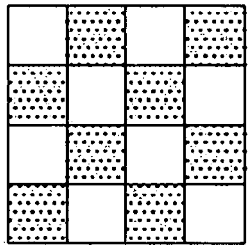
Figure 10:
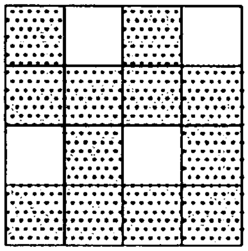
Figure 10:
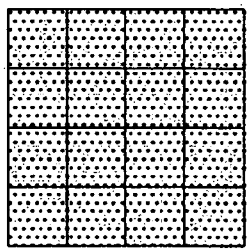

FIG. 9 is a block diagram illustrating a configuration of the dithering unit 210 included in the timing controller 200 shown in FIG. 2. FIG. 10 is a schematic view illustrating third dithering patterns used in the dithering unit 210 shown in FIG. 9.

As shown in FIG. 9, the dithering unit 210 includes a position determiner 214, a dither value selector 216, and an adder 218. Where the dithering unit 210 uses an FRC dithering method, the dithering unit 210 further includes a frame determiner 212.

The frame determiner 212 counts pulses of the vertical synchronizing signal Vsync selected from among the plural synchronizing signals Vsync, Hsync, DE, and DCLK, to detect the number of frames. The frame determiner 212 outputs information representing the number of detected frames to the dither value selector 216.

The position determiner 214 detects respective pixel positions of input data Rc1, Gc1, and Bc1, using at least one of the synchronizing signals Vsync, Hsync, DE, and DCLK. For example, the position determiner 214 determines respective horizontal pixel positions of the input data Rc1, Gc1, and Bc1 while counting pulses of the dot clock DCLK in an enable period of the data enable signal DE, and determines respective vertical pixel positions of the input data Rc1, Gc1, and Bc1 while counting pulses of the horizontal synchronizing signal Hsync in a period in which both the vertical synchronizing signal Vsync and the data enable signal DE are enabled. The position determiner 214 outputs information representing the detected pixel positions to the dither value selector 216.

The dither value selector 216 selects desired dither values Dr, Dg, and Db from among a plurality of dithering patterns, using the grayscale levels corresponding to respective lower-order bits of the data Rc1, Gc1, and Bc1 output from the compensation circuit 100 and the pixel position information output from the position determiner 214. The dither value selector 216 then outputs the selected dither values Dr, Dg, and Db. Where the dithering value selector 216 selects the dithering values Dr, Dg, and Db, using an FRC dithering method, the dithering value selector 216 additionally uses the frame number information input from the frame determiner 162.

The dither value selector 216 includes a plurality of third dithering patterns previously stored in the dither value selector 216 by the designer. For example, as shown in FIG. 10, the dither value selector 216 stores 4 second dithering patterns each having a 4*4 pixel size, in the form of a look-up table. The third dithering patterns are arranged to have gradually-increased numbers of pixels having a dither value of “1” (dot) in accordance with the grayscale levels of “¼”, “2/4”, “¾”, and “4/4”, respectively. Meanwhile, where the FRC dithering method is used, a plurality of additional third dithering patterns, in which the positions of pixels having a dither value of “1” are different by frames even for the same grayscale level, may also be stored. The size of the third dithering patterns and the positions of pixels having a dither value of “1” may be diversely varied in accordance with a desire of the designer.

The dithering unit 210 separates the 10 bits of each of the data Rc1, Gc1, and Bc1 input from the compensation circuit 100 into the lower-order 2 bits and the remaining 8 bits, and supplies the lower-order 2 bits to the dither value selector 216 while supplying the remaining 8 bits to the adder 218. The dither value selector 216 selects a dithering pattern corresponding to the grayscale level of the separated lower-order 2 bits, from among the third dithering patterns as shown in FIG. 10, and selects 1-bit dither values Dr, Dg, and Db corresponding to respective pixel positions of the input data Rc1, Gc1, and Bc1 from the selected dithering pattern, using the pixel position information output from the position determiner 214. The dithering unit 210 then outputs the selected dither values Dr, Dg, and Db to the adder 218.

The adder 218 adds each of the dither values Dr, Dg, and Db selected by the dither value selector 216 to the upper-order 8 bits of the input data Rc1, Gc1, or Bc1, from which the lower-order 2 bits were separated. The adder 218 then outputs the resultant data as 8-bit compensated data Rc2, Gc2, and Bc2.

When the 10-bit data output in the first frame and the 10-bit data in the second frame have a grayscale level difference of "1" because the data input to the second compensator 180 of the compensation circuit 100 has an odd grayscale level, the lower-order 2 bits of the data input to the dithering unit 210 in the first frame is different from that of the second frame. In this case, accordingly, dither values are selected from third dithering patterns corresponding to the grayscale levels of the two different lower-order 2 bits, respectively. Thus, the dithering unit 210 executes a fine brightness compensation, using a combination of the second dithering pattern used in the second dithering unit 160 of the second compensator 180 and the third dithering pattern used in the dithering unit 210 of the timing controller 200.

Thus, the LCD device according to the illustrated embodiment of the present invention can compensate data to be displayed on an atypical defect region and/or a typical defect region, irrespective of the type of the defect region, using the integrated atypical/typical compensation circuit 100.

Figure 11:
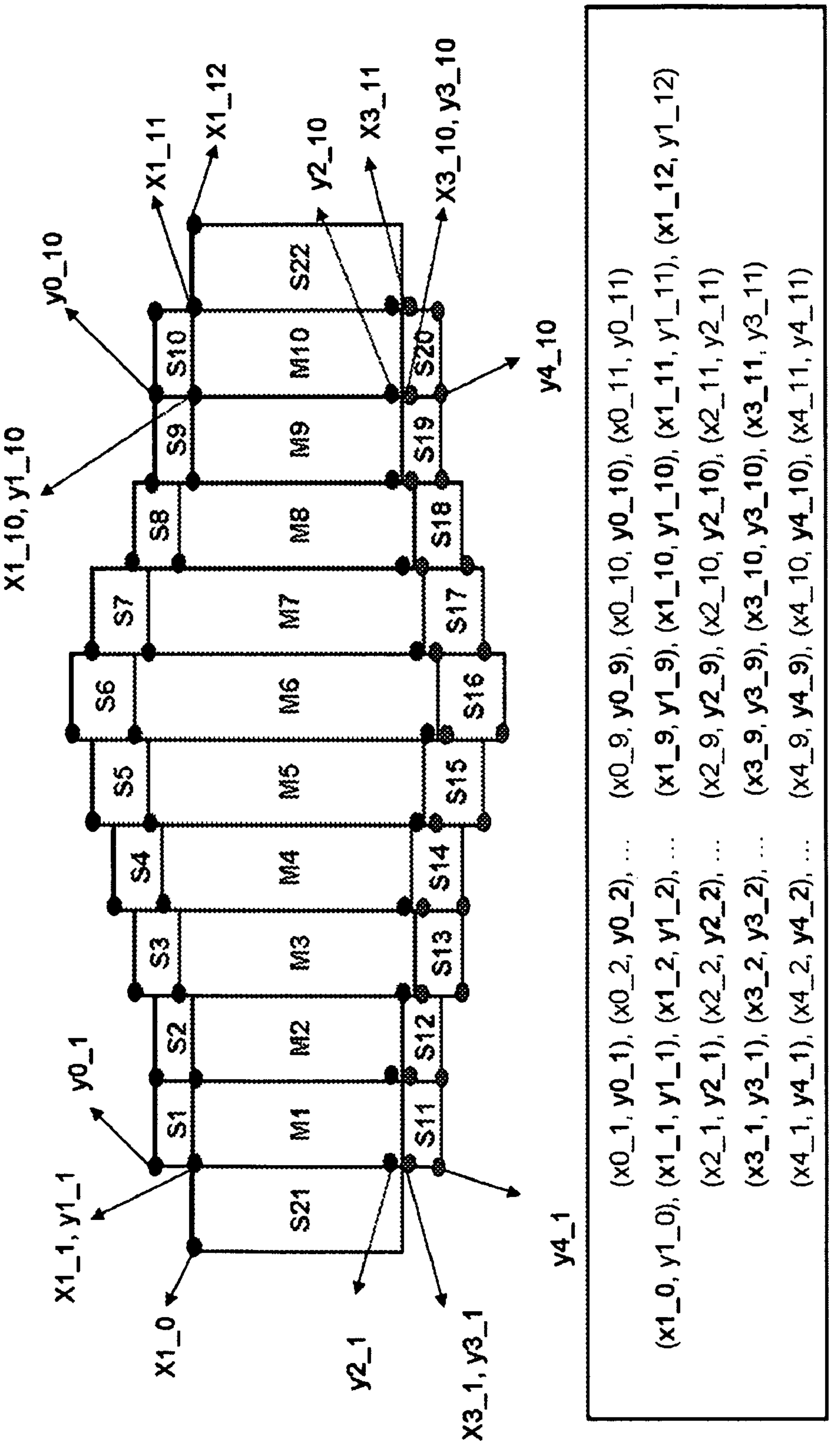
FIG. 11 is a diagram illustrating coordinates generated for a plurality of main compensation regions and a plurality of auxiliary compensation regions for the atypical defect region shown in FIG. 3A.

Meanwhile, in accordance with the present invention, it may be possible to selectively store x or y-coordinates for the main and auxiliary compensation regions of each atypical defect region, without storing both the x and y-coordinates for each of the main and auxiliary compensation regions, as shown in FIG. 11, in order to achieve a reduction in the capacity of the memory 120. This will be described hereinafter.

FIG. 11 illustrates main and auxiliary compensation regions set to compensate one atypical defect region, for example, 10 main compensation regions M1 to M10, and 22 auxiliary compensation regions S1 to S22 set at upper, lower, left, and right sides of the 10 main compensation regions M1 to M10.

In the case of FIG. 11, 57 x-y coordinates are required to set the positions of the 10 main compensation regions M1 to M10 and the positions of the 22 auxiliary compensation regions S1 to S22. Between the main compensation regions M1 to M10 and the auxiliary compensation regions S1 to S22, however, there are compensation regions overlapping in terms of x or y coordinates, namely, having the same x or y coordinate. For each of the upper auxiliary compensation regions S1 to S10, and left and right auxiliary compensation regions S21 and S22, accordingly, only an x or y-coordinate thereof not overlapping with those of the main compensation region M1 to M10 is selected and stored. Meanwhile, in order to enable memory spaces assigned to the position information of the compensation regions for atypical defects to be also used for the compensation regions for typical defects, the coordinates of the lower auxiliary compensation regions S11 to S20 are set, independently of those of the main compensation regions M1 to M10, even though there is a coordinate overlap between the lower auxiliary compensation regions S11 to S20 and the main compensation regions M1 to M10. In this case, it is possible to store the position information of the compensation regions for two typical defect regions in a memory space set to store the position information of the compensation regions for one atypical defect region.

In detail, 13 x1-coordinates x1_0, x1_1, x1_2, . . . , x1_9, x1_10, x1_11, and x1_12 indicating (the positions of left and right boundaries for the 10 main compensation regions M1 to M10 and two, namely, left and right, auxiliary compensation regions S21 and S22, 10 y1-coordinates y1_l, y1_2, . . . , y1_9 indicating the positions of upper boundaries for the 10 main compensation regions M1 to M10, and y1_10, and 10 y2-coordinates y2_1, y2_2, . . . , y2_9, and y2_10 indicating the positions of lower boundaries for the 10 main compensation regions M1 to M10 are set. Also, 10 y0-coordinates y0_1, y0_2, . . . , y0_9, and y0_10 indicating the positions of upper boundaries for 10 upper auxiliary compensation regions S1 to S10 are set.

Also, 11 x3-coordinates x3_1, x3_2, . . . , x1_9, x1_10, and x1_11 indicating the positions of left and right boundaries for the lower auxiliary compensation regions S11 to S20, 10 y3-coordinates y3_1, y3_2, . . . , y3_9, and y3_10 indicating the positions of upper boundaries for the lower auxiliary compensation regions S11 to S20, and 10 y4-coordinates y4_1, y4_2, . . . , y4_9, and y4_10 indicating the positions of lower boundaries for the lower auxiliary compensation regions S11 to S20 are set. In this case, the 11 x3-coordinates x3_1, x3_2, . . . , x1_9, x1_10, and x1_11 indicating the positions of left and right boundaries for the lower auxiliary compensation regions S11 to S20 are identical to the 11 x1-coordinates x1_1, x1_2, x1_9, x1_10, and x1_11 indicating the positions of left and right boundaries for the 10 main compensation regions M1 to M10, respectively. The 10 y3-coordinates y3_1, y3_2, . . . , y3_9, and y3_10 indicating the positions of upper boundaries for the lower auxiliary compensation regions S11 to S20 are set by adding a value of "1" to the y2-coordinates y2_1, y2_2, . . . , y2_9, and y2_10 indicating the positions of lower boundaries for the 10 main compensation regions M1 to M10, respectively. Although there is a coordinate overlap between the lower auxiliary compensation regions S11 to S20 and the main compensation regions M1 to M10, the coordinates of the lower auxiliary compensation regions S11 to S20 are set, independently of those of the main compensation regions M1 to M10. Accordingly, it is possible to store the position information of the compensation regions for two typical defect regions in the memory space set to store the position information of the compensation regions for one atypical defect region.

Thus, it is possible to store only 24 x-coordinates and 50 y-coordinates, without storing 57 x-y coordinates, namely, 57 x-coordinates and 57 y-coordinates, respectively indicating the positions of the plural compensation regions divided from one atypical defect region. Accordingly, it is possible to reduce the memory space for the position information. Also, the position information of the lower auxiliary compensation regions S11 to S20 are stored, independently of the position information of the main compensation regions M1 to M10. Accordingly, it is possible to store the position information of compensation regions for two typical defect regions as shown in FIG. 3B, in a memory space set to store the position information of compensation regions for one atypical defect region as shown in FIG. 3A.

To accomplish the above-described aspect, the parameters of the position information of compensation regions for atypical defects and the parameters of the position information of compensation regions for typical defects are unified. The position information of the 10 main compensation regions M1 to M10 and 22 auxiliary compensation regions S1 to S22 assigned to compensate for one atypical defect as shown in FIG. 3A is set by 24 x-coordinates and 50 y-coordinates, and stored in the memory. On the other hand, the position information of the 10 compensation regions assigned to compensate for a first typical defect as shown in FIG. 3B is set by 13 x-coordinates and 30 y-coordinates. Also, the position information of the 10 compensation regions assigned to compensate for a second typical defect as shown in FIG. 3B is set by 11 x-coordinates and 20 y-coordinates. Although only 11 x-coordinates and 20 y-coordinates are needed for the 10 compensation regions for compensating for the first typical defect, as in the compensation regions for the second typical defect, 2 virtual x-coordinates and 10 virtual y-coordinates are additionally set, for a parameter unification with the case of FIG. 3A. That is, the parameters of the compensation regions for two typical defects as shown in FIG. 3B are set by 24 x-coordinates and 50 y-coordinates. Accordingly, the parameters of FIG. 3B are unified with the parameters of the compensation regions for one atypical defect as shown in FIG. 3A, respectively. Thus, memory spaces assigned to the position information of the compensation regions for atypical defects can also be used for the compensation regions for typical defects.

As apparent from the above description, in accordance with the present invention, it is possible to store the position information of compensation regions for two typical defect regions in a memory space set to store position information of compensation regions for one atypical defect region by unifying the position information parameters of the compensation regions for one atypical defect and the position information parameters of the compensation regions for two typical defects. Accordingly, only one memory can be used to store the position information of defect regions, irrespective of the type of defects, namely, atypical defects or typical defects. Also, the same memory space can be used to store both the position information of compensation regions for atypical defects and the position information of compensation regions for typical defects. Thus, it is possible to reduce the capacity of the memory, as compared to the case in which the position information of compensation regions for atypical defects and the position information of compensation regions for typical defects are stored at different addresses or in separate memories, respectively.

Meanwhile, the data compensation circuit according to the above-described embodiment of the present invention can be applied not only to an LCD device, but also to other video display devices such as OLED and PDP devices.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A video display device comprising:

a display panel;

a memory storing atypical or typical defect information used to compensate atypical or typical defect regions of the display panel;

an integrated atypical or typical compensation circuit comprising a first compensator for compensating input data to be displayed on the atypical or typical defect regions, using the atypical or typical defect information from the memory, and a second compensator for finely compensating the data compensated by the first compensator, using first and second dithering patterns, the compensation circuit supplying data to be displayed on normal regions, without compensation;

a timing controller comprising a dithering unit for finely compensating data output from the integrated atypical or typical compensation circuit, using a third dithering pattern different from the first and second dithering patterns; and a panel driver for driving the display panel under a control of the timing controller, wherein the second compensator includes:

a first dithering unit for executing a dithering operation for N-bit input data ("N" is a positive integer) received from the first compensator using a first dithering pattern;

a second dithering unit for executing a dithering operation for the N-bit input data received from the first compensator using a second dithering pattern; and a multiplexer for selecting an output from the first dithering unit or the second dithering unit in accordance with a dithering-off or dithering-on of the timing controller, and wherein the second dithering pattern has a small size than the first dithering pattern and the third dithering pattern has a small size than the first dithering pattern and a large size than the second dithering pattern, and wherein the multiplexer selects the output from the first dithering unit when the dithering-off and selects the output from the second dithering unit when the dithering-on.

2. The video display device according to claim 1, wherein the memory stores:

the atypical or typical defect information including position information of a plurality of compensation regions divided from each of the atypical or typical defect regions, information of a plurality of grayscale ranges divided from a range of all grayscale levels, and compensation data for the plurality of compensation regions;

a first control signal including a first bit representing whether or not a compensation for display defects is required, a second bit representing a type of display defects, and a third bit representing whether or not a compensation for point defects is required;

a second control signal including information of a plurality of signs instructing of an addition or subtraction of the compensation data in accordance with an order of a plurality of atypical or typical defect regions; and a third control signal instructing of the dithering-on/off of the timing controller.

3. The video display device according to claim 2, wherein the first compensator comprises:

a bit expander for bit-expanding the input data, and outputting the bit-expanded data;

a coordinate calculator for calculating pixel coordinates of the input data;

a grayscale determiner for selecting grayscale range information corresponding to the input data output from the bit expander, from among the grayscale range information from the memory, and outputting the selected grayscale range information;

a position determiner for outputting position information of compensation regions corresponding to the input data and a number of detected atypical or typical defect regions, using the pixel coordinates from the coordinate calculator and the position information of the compensation regions for the atypical or typical defect regions from the memory;

a compensation data selector for selecting compensation data corresponding to the input data from among the compensation data from the memory, using the grayscale range information from the grayscale determiner and the position information from the position determiner, and outputting the selected compensation data;

an adder for adding the compensation data output from the compensation data selector to the input data output from the bit expander;

a subtractor for subtracting the compensation data output from the compensation data selector to the input data output from the bit expander;

a first multiplexer for sequentially outputting, from the memory, the information of the plural signs included in the second control signal in accordance with the detected atypical or typical defect region number output from the position determiner; and a second multiplexer for selecting an output from the adder or an output from the subtractor in accordance with the sign information output from the first multiplexer.

4. The video display device according to claim 3, wherein the coordinate calculator comprises:

a horizontal counter for detecting a number of pixels in a horizontal direction for the input data;

a vertical counter for detecting a number of pixels in a vertical direction for the input data;

a first coordinate calculator for outputting the pixel number input from the horizontal counter, as an x-coordinate for the input data, and outputting the pixel number input from the vertical counter, as a y-coordinate for the input data;

a second coordinate calculator for outputting the pixel number input from the horizontal counter, as a y-coordinate for the input data, and outputting the pixel number input from the vertical counter, as an x-coordinate for the input data; and a multiplexer for selecting the coordinates output from the first coordinate calculator when the first control signal indicates a typical/vertical defect region, and selecting the coordinates output from the second coordinate calculator when the first control signal indicates a horizontal defect region, and supplying the selected coordinates to the position determiner.

5. The video display device according to claim 2, wherein:

the first dithering unit outputs "N-3"-bit data reduced from the N-bit input data by lowermost-order 3 bits using a first dithering pattern having an 8*32 pixel size;

the second dithering unit outputs "N-1"-bit data reduced from the N-bit input data by a lowermost-order 1 bit using a second dithering pattern having a 1*1 pixel size; and the multiplexer selects the output from the first dithering unit when the third control signal instructs of the dithering-off of the timing controller, and selecting an output from the second dithering unit when the third control signal instructs of a dithering-on of the timing controller; and the dithering unit of the timing controller executes a dithering operation for the "N-1"-bit data, using the third dithering pattern having a 4*4 pixel size, thereby outputting "N-3"-bit data reduced from the "N-1"-bit data by lowermost-order 2 bits, and determines a fine compensation value in accordance with a combination of the second and third dithering patterns.

6. The video display device according to claim 5, wherein the timing controller further comprises a multiplexer for selecting an output from the dithering unit or an output from the integrated atypical or typical compensation circuit in accordance with the third control signal.

7. The video display device according to claim 1, wherein:

the memory further stores point defect information as to point defect regions of the display panel; and the integrated atypical or typical compensation circuit further comprises a third compensator for compensating data input from the second compensator, using the point defect information from the memory.

8. The video display device according to claim 2, wherein:

each of the atypical defect regions comprises:

a plurality of main compensation regions horizontally divided from the atypical defect region; and a plurality of auxiliary compensation regions arranged at upper, lower, left, and right sides of the plural main compensation regions; and the plural main compensation regions and the plural auxiliary compensation regions have the same horizontal width, and have different vertical widths set in accordance with a distribution degree of the atypical defect regions.

9. The video display device according to claim 2, wherein the position information of the plural compensation regions for each atypical defect region and the position information of the plural compensation regions for each typical defect region are stored such that parameters of the position information for the atypical defect region and parameters of the position information for the typical defect region are unified.

* * * * *